UNITED STATES PATENT OFFICE.

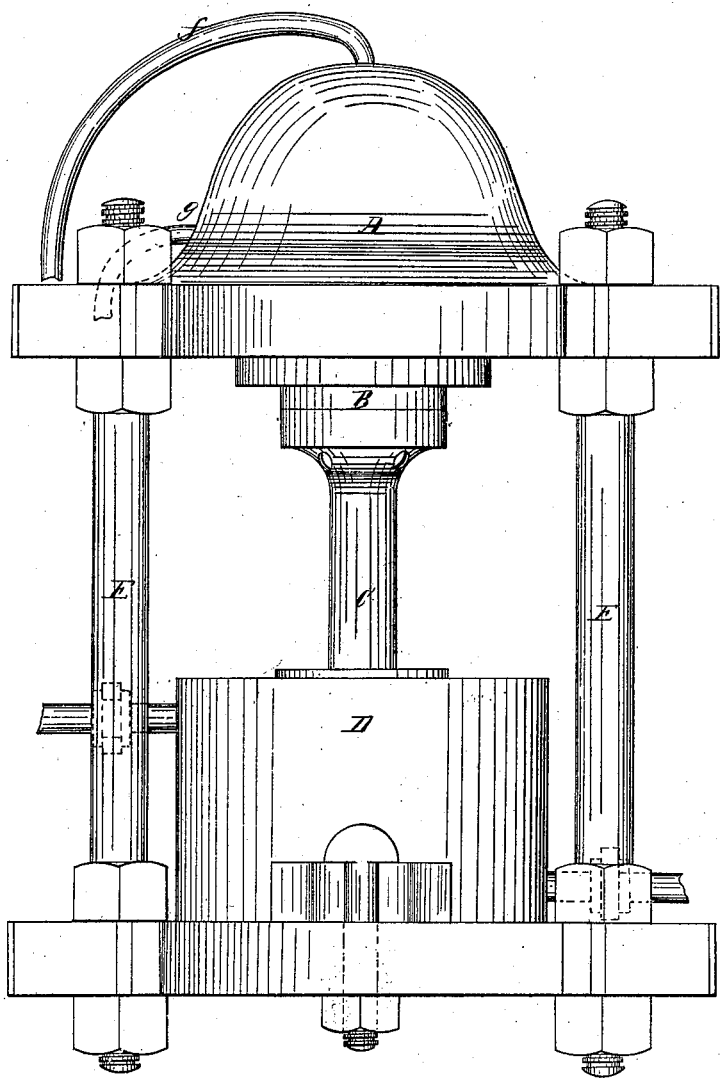

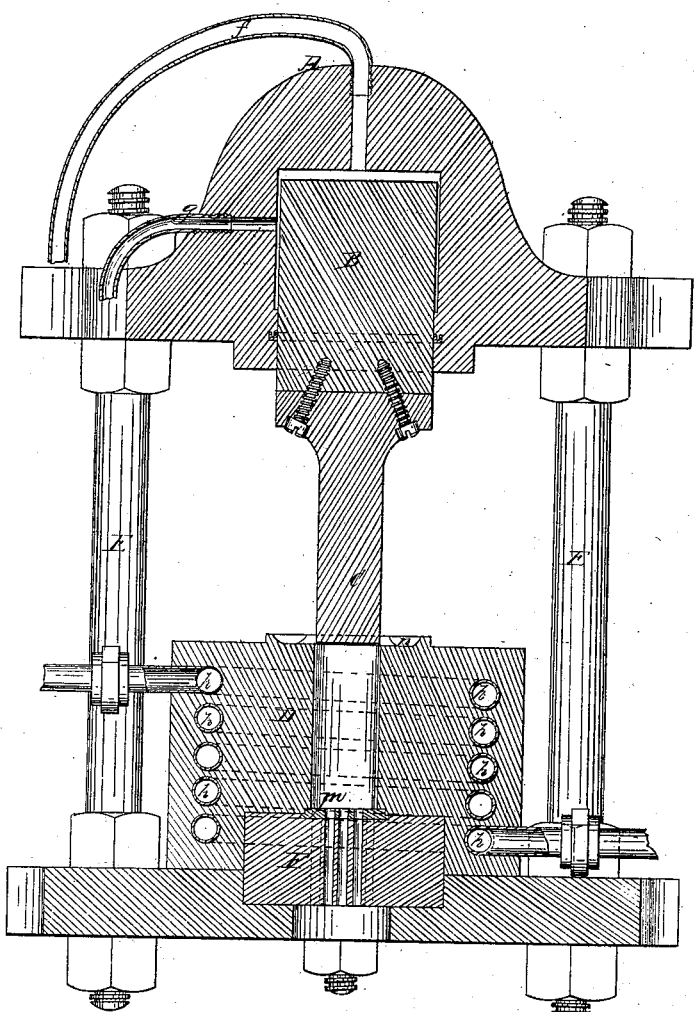
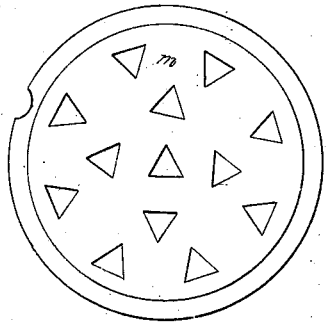

LEWIS CROOKE AND ROBERT CROOKE, OF NEW YORK, N. Y.

IMPROVED MACHINE FOR THE MANUFACTURE OF ROD-SOLDER.

Specification forming part of Letters Patent No. 54,121, dated April 24, 1866.

*To all whom it may concern:*

Be it known that we, LEWIS CROOKE and ROBERT CROOKE, of the city, county, and State of New York, have invented a new and useful Machine for the Manufacture of Rod-Solder; and we do hereby declare that the following is a full, clear, and exact description of the same, reference being had to the accompanying drawings, in which—

Figure 1 represents an elevation of our machine. Fig. 2 represents a vertical section of the same through the center of the ram and piston, and Fig. 3 represents a plan of the die of the machine, of full size.

The object of our invention is to manufacture compressed rod-solder; and our invention consists of a machine which is a combination of a hydraulic cylinder and ram, a solder cylinder and piston, and a die perforated with a number of holes, the whole operating in such manner that the solder is forced through the die by hydraulic pressure, and is divided into a number of compressed rods, which issue simultaneously from the die.

Our invention consists, further, of the combination of the solder-cylinder with its piston, and die perforated with numerous holes with a coil of pipe in the walls of the solder-cylinder, so that the said cylinder may be kept cool by the action of a current of water, thereby causing the solder to set more rapidly previous to its expression through the holes of the die in the form of compressed rods.

The machine represented in the accompanying drawings represents the mode in which we have constructed our machine.

The hydraulic cylinder A is constructed of cast-iron, which may be lined with sheet-copper if found expedient, and it is fitted with a ram, B, which is packed in the usual manner practiced with the rams of hydraulic presses. This ram is connected with a plunger or piston, C, which fits into a cylinder, D, in which the solder is placed. The solder-cylinder D and the hydraulic cylinder A are connected by wrought-iron standards E, of sufficient size to resist the greatest strain required in the operation of the machine.

The perforated die $m$ is fitted to the bottom of the solder-cylinder, and is perforated with numerous holes, each of the size and form of a transverse section of the rod of solder to be made, and the form of hole which is preferred is a triangle, as represented at Fig. 3. The perforations must be numerous, as represented, there being one of a sectional area of about six one-hundredths of a square inch for about each eighty-five one-hundredths of a square inch of the area of the piston of the solder-cylinder, because the rods must be of small cross-section to suit the trade, and the perforations must accord therewith; and solder is so hard and unyielding a material that a number of such perforations are required to permit the solder to escape with the requisite freedom from the solder-cylinder to permit the movement of a piston of a reasonable size for practical use without breakage from excessive pressure.

The die is supported upon a base-block, F, which is perforated with as many holes as there are holes in the die, but of slightly larger size, so as to permit the free passage of the rod-solder from the die.

The head of the solder-cylinder has a shallow groove, $n$, formed upon it, with an opening into the cavity of the cylinder, so that the melted solder can be readily poured into the said cavity.

The hydraulic cylinder is fitted with a supply-pipe, $f$, leading from a force-pump of the usual construction of pumps for hydraulic presses. It is also fitted with an escape-pipe, $g$, to permit the escape of water after an operation is completed.

Melted solder of the usual composition—say two parts lead and one part tin—is poured into the solder-cylinder and permitted to cool. As soon as it sets the force-pump is put into operation, and the solder is expressed in the form of a number of rods simultaneously from the die.

In order that the solder may be made to set rapidly, so that the machine may be used to make a number of operations in rapid succession, the solder-cylinder has a coil of pipe, $h$, cast in it, and a current of water is caused to flow through this coil, so as to abstract the heat rapidly.

The pressure required is very great, a solder-cylinder three and a half inches in diameter, fitted with the die represented at Fig. 3, having thirteen triangular perforations, each with sides three-eighths of an inch broad, requiring a pressure of about three hundred tons upon its piston to do the work.

What we claim as our invention, and desire to secure by Letters Patent, is—

1. The hydraulic-pressure solder-machine composed of the hydraulic cylinder and ram, the solder-cylinder and piston, and the die perforated with numerous holes of the form and size of the rods to be produced, all combined and operating substantially as set forth.

2. The combination of the solder-cylinder, piston, and die perforated with numerous holes, as aforesaid, with a pipe to supply water to cool the solder-cylinder, substantially as set forth.

In testimony whereof we have hereunto set our hands this 23d day of October, A. D. 1865.

LEWIS CROOKE.
    ROBERT CROOKE.

Witnesses:
 GEORGE H. CAREY,
 WM. JS. EGINTON.